United States Patent
Jans et al.

(10) Patent No.: US 6,787,598 B2
(45) Date of Patent: Sep. 7, 2004

(54) PIGMENT PASTE

(75) Inventors: Robertus Jozef Franciscus Jans, Zwanenburg (NL); Eugene Michael Arnoldus De Jong, Leiderdorp (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 10/152,063

(22) Filed: May 21, 2002

(65) Prior Publication Data

US 2002/0193471 A1 Dec. 19, 2002

Related U.S. Application Data

(60) Provisional application No. 60/307,518, filed on Jul. 24, 2001.

(30) Foreign Application Priority Data

May 30, 2001 (EP) ............................................. 01202044

(51) Int. Cl.⁷ ............................. C08K 5/09; C08K 5/10; C08L 51/00
(52) U.S. Cl. ........................ 524/539; 524/284; 524/356
(58) Field of Search ................................ 524/284, 356, 524/539

(56) References Cited

U.S. PATENT DOCUMENTS

| | | | | |
|---|---|---|---|---|
| 3,920,597 | A | 11/1975 | Nicks et al. | ............... 260/22 R |
| 5,158,608 | A | 10/1992 | Sodhi | ......................... 106/244 |
| 5,645,636 | A | 7/1997 | Schneider et al. | .......... 106/493 |
| 5,648,417 | A * | 7/1997 | Fushimi et al. | ............. 524/513 |
| 6,414,048 | B1 * | 7/2002 | Sanduja et al. | ................ 522/42 |

FOREIGN PATENT DOCUMENTS

| | | | | |
|---|---|---|---|---|
| DE | 23 61 293 | | 3/1975 | ........... C09D/17/00 |
| EP | 12 964 | A1 | 7/1980 | ........... C08G/63/66 |
| EP | 311 209 | A1 | 4/1989 | ............ C09D/7/14 |
| EP | 507 202 | A1 | 10/1992 | ........... C09D/17/00 |
| GB | 1 337 501 | | 11/1973 | ............. C09C/3/00 |
| GB | 1 485 444 | | 9/1977 | ........... C08L/67/08 |
| JP | 620 10176 | | 1/1987 | ........... C09D/17/00 |
| JP | 620 10177 | | 1/1987 | ........... C09D/17/00 |

OTHER PUBLICATIONS

Derwent Abstract 002532172 (1980), abstracting EP 12 964 A1.
Derwent Abstract 009206051 (1992), abstracting EP 507 202 A1.
Derwent Abstract 001368072 (1975), abstracting DE 23 61 293.
Derwent Abstract 007053881 (1987), abstracting JP 620 10176.
Derwent Abstract 007053882 (1987), abstracting JP 620 10177.

* cited by examiner

Primary Examiner—Kriellion A. Sanders
(74) Attorney, Agent, or Firm—Michelle J. Burke; Lainie E. Parker

(57) ABSTRACT

A pigment paste for tinting a coating composition, the pigment paste comprising at least one branched alkyd having a viscosity below 5 Pa.s, preferably below 3.5 Pa.s, at 23° C. and at a shear rate of 100 s$^{-1}$, and pigment. The pigment paste can also include an aromate-free solvent. The number average molecular weight Mn of the alkyd is preferably between 2,000 and 2,400 g/mole. The degree of branching of the alkyd is preferably at least 0.35 and preferably below 0.42. The oil length is preferably between 76 and 84. The VOC is preferably below 250 g/l.

18 Claims, No Drawings

PIGMENT PASTE

This application claims priority of U.S. Provisional Patent Application No. 60/307,518, filed Jul. 24, 2001.

FIELD OF THE INVENTION

The present invention relates to a pigment paste for the tinting of paint, e.g., at a point of sale or during paint production by colour mixing systems.

BACKGROUND OF THE INVENTION

In the paint industry, stock control and logistics are rationalised by using colour mixing systems. In such systems, a paint colour selected by a user is produced by selecting a base paint from a number of available base paints and tinting the selected base paint with the aid of one or more pigment pastes. Such systems are for example used in the field of decorative coatings. EP-A 0 311 209 discloses such a system.

Examples of pigment pastes for paint tinting systems are disclosed in EP-A 0 012 964 and EP-A 0 507 202. Next to pigments, pigment pastes typically include resins, solvents, and in general also additives. Pigments of the various colours vary considerably in nature. For each pigment, a compatible resin needs to be used. This resin needs, in turn, to be compatible with the binder system of the used base paints and with resins of the other pigment pastes as well, since for most colours, the addition of more than one pigment paste is required. The resin should also be able to disperse a sufficient amount of the pigment. Up to now it has not been possible to use tinting systems for high solids paints having a solids content of more than about 70% by weight, due to the high solvent content of the pigment pastes. The solvent content of current state of the art pigment pastes is so high that a paint made by mixing these pastes into a high solids base paint will have a substantially higher volatile organic content (VOC) than the original base paint.

The object of the invention is to provide a pigment paste comprising a resin which is compatible with all types of pigments. The resin should have sufficient dispersing and wetting power to disperse the pigments. Preferably, it should be possible to use the pastes for tinting high solids paints. The paste should not have a substantially negative effect on the viscosity, applicability, stability or VOC level of the paint to be mixed.

SUMMARY OF THE INVENTION

The object of the invention is achieved by a pigment paste for tinting a coating composition which pigment paste comprises at least one branched alkyd having a viscosity below 5 Pa.s, preferably below 3.5 Pa.s, at 23° C. at a shear rate of 100 s$^{-1}$, and one or more pigments.

Surprisingly, it has been found that such alkyd resins are compatible with all types of pigments, organic as well as inorganic. The resins allow high pigment contents, while the solvent content can be kept very low. This makes it easier to mix paints complying with the latest VOC regulations, and more particularly to mix high solids paints.

DETAILED DESCRIPTION OF THE INVENTION

Suitable examples of the alkyds in the invention are given in U.S. Pat. No. 5,158,608, herewith incorporated by reference, or similar alkyds with a lower degree of branching.

A possible parameter for controlling viscosity is the number average molecular weight Mn of the alkyd, which preferably is more than 1,500, more preferably between 2,000 and 2,400 g/mole. The molecular weight Mn in this case is measured using Gel Permeation Chromatography using polystyrene calibration.

Oil length has an influence on viscosity. Therefore, it is preferred to use an alkyd having an oil length of at least 76 and preferably below 84.

Controlling the degree of branching is another way to obtain an alkyd with the required viscosity while the molecular weight can still be kept high. The degree of branching is defined as the probability that a randomly selected functional group of a branch unit is connected to another branch unit either directly or via a chain of bifunctional units (P. J. Flory, *Principles of Polymer Chemistry*, Cornell University Press, Ithaca, N.Y., 1953). A suitable computer program for calculating the degree of branching is Recom 36X, of Akzo Nobel Resins, Bergen op Zoom, The Netherlands. Preferably, the degree of branching of the alkyd is at least 0.35 and more particularly below 0.42. The degree of branching can be increased by increasing the average functionality of the monomers.

The degree of branching can be lowered by using more di-functional monomers. Suitable diols for use as the initiator compound are for instance 1,3-propane diol, 1,2-ethane diol, 1,4-butane diol, 1,5-pentane diol, 1,6-hexane diol, and polytetrahydrofuran. Suitable branched diols are for instance dimethylol propane, neopentyl glycol, 2-propyl-2-methyl-1,3-propane diol, 2-butyl-2-ethyl-1,3-propane diol, 2,2-diethyl-1,3-propane diol, 1,2-propane diol, 1,3-butane diol, 2,2,4-trimethylpentane-1,3-diol, trimethylhexane-1,6-diol, 2-methyl-1,3-propane diol, diethylene glycol, triethylene glycol, polyethylene glycols, dipropylene glycol, tripropylene glycol, and polypropylene glycols. Suitable cycloaliphatic diols are for example cyclohexane dimethanol and cyclic formals of pentaerythritol, and 1,3-dioxane-5,5-dimethanol. Suitable aromatic diols are for instance 1,4-xylylene glycol and 1-phenyl-1,2-ethane diol, and the reaction products of polyfunctional phenolic compounds and alkylene oxides or derivatives thereof. Examples of suitable phenolic compounds are Bisphenol A, hydroquinone, and resorcinol. An example of a suitable ester diol is neopentyl-hydroxypivalate.

Suitable triols for increasing the degree of branching if so required are for example trimethylol propane, trimethylol ethane, trimethylol butane, 3,5,5-trimethyl-2,2-dihydroxymethylhexane-1-ol, glycerol, and 1,2,6-hexane triol. Alternatively, cycloaliphatic and aromatic triols and/or corresponding adducts with alkylene oxides or derivatives thereof can be used. Suitable tetrols are for example pentaerythritol, ditrimethylol propane, diglycerol and ditrimethylol ethane. It is also possible to use cycloaliphatic and aromatic tetrols as well as corresponding adducts with alkylene oxides or derivatives thereof. Suitable polyfunctional carboxylic acids and/or corresponding anhydrides are maleic anhydride, fumaric acid, orthophthalic anhydride, terephthalic acid, isophthalic acid, adipic acid, azelaic acid, sebacic acid, tetrahydrophthalic anhydride, hexahydrophthalic anhydride, and succinic acid.

Suitable chain extenders are for example monofunctional carboxylic acids having at least two hydroxyl groups. The chain extender can comprise dimethylolpropionic acid, α,α-bis-(hydroxymethyl)-butyric acid, .α,α,α.-tris-(hydroxymethyl)-acetic acid, .α,α-bis(hydroxymethyl)-valeric acid, .α,α-bis-(hydroxy)propionic acid or α-phenylcarboxylic acids having at least two phenolic hydroxyl groups.

A chain stopper should be used which comprises oxidatively drying groups, such as fatty acids. Suitable unsaturated fatty acid chain stoppers are for instance oleic acid, ricinoleic acid, linoleic acid, linolenic acid, erucic acid, soybean fatty acid, linseed fatty acid, dehydrated castor fatty acid, tall oil fatty acid, tung oil fatty acid, sunflower fatty acid, and safflower fatty acid.

Additionally other chain stoppers may be used, for example saturated monofunctional carboxylic acids or saturated fatty acids or anhydrides thereof; unsaturated monofunctional carboxylic acids, such as (meth)acrylic acids; aromatic monofunctional carboxylic acids such as benzoic acid and para-tert.butylbenzoic acid; epihalohydrins such as 1-chloro-2,3-epoxy propane and 1,4-dichloro-2,3-epoxy butane; glycidyl esters of a monofunctional carboxylic acid or of a fatty acid having up to 24 carbon atoms; epoxides of an unsaturated fatty acid with 3–24 carbon atoms such as epoxidised soybean fatty acid.

The chain stopper of the first-mentioned type may be linear or branched. Examples include acetic acid, propionic acid, butyric acid, valeric acid, isobutyric acid, trimethylacetic acid, caproic acid, caprylic acid, heptanoic acid, capric acid, pelargonic acid, lauric acid, myristic acid, palmitic acid, stearic acid, behenic acid, lignoceric acid, ceratic acid, montanoic acid, isostearic acid, isononanoic acid, and 2-ethylhexanoic acid.

Examples of suitable glycidyl esters of a monofunctional carboxylic acid or of a fatty acid are for instance 1,2-epoxy-3-allyloxypropane, 1-allyloxy-2,3-epoxypropane, 1,2-epoxy-3-phenoxypropane, and 1-glycidyloxy-2-ethyl hexane.

The reaction can be carried out without using a catalyst. If so required, a catalyst such as naphthalene sulphonic acid or para-toluene sulphonic acid can suitably be used. However, the initial step can be performed in the presence of an acid catalyst and subsequently the reaction product may be neutralised if so desired prior to a reaction with a chain stopper.

Dispersing properties of the resin are optimised if the acid value of the alkyd is between 6 and 12 mg KOH/g. If so required, surfactants can be used.

Pigments include inorganic as well as organic pigments. Examples of inorganic pigments include titanium dioxide, zinc oxide, carbon black, iron oxides, bismuth vanadates, raw and burnt sienna or umber, chromium oxide green, cadmium pigments, chromium pigments, etc. Examples of organic pigments include phthalocyanines, quinacridones, quinophthalones, anthraquinones, isoindolines, pyranthrones, indanthrones, derivatives of dioxazine, diketopyrrolopyrroles, azo-compounds, etc. Optionally, filler pigments may be added, such as clay, silica, talc, mica, woolastonite, wood flower, and the like.

High pigment contents can be realised in the pigment pastes according to the present invention without the use of high amounts of solvent. If organic pigments are used, the pigment content can range, for example, from 5–45% by weight, preferably from 25–40% by weight. If inorganic pigments are used, the pigment content should preferably be more than 10% by weight or, more preferably, even more than 60% by weight. If translucent pigments, e.g. translucent iron oxides, are used, the pigment content can be over 5% by weight, preferably over 20% by weight or even over 30%.

Preferably, the volatile organic content VOC is below 300 g/l, more preferably below 250 g/l. If solvents are used, these should preferably have a low content of aromate groups, e.g. in the range of 0–1,100 mg/kg. For example, the pigment paste can include 2–25% of an aromate-free solvent. Suitable solvents are for instance aliphatic solvents, such as Shellsol D60, from Shell, and Exxsol D60, from Exxon. Other suitable solvents are ketones or low molecular weight esters with a molecular weight Mw below 1,500 g/mole.

If so desired, the pigment pastes according to the invention may also comprise anti-foaming agents, matting agents, anti-settling agents, anti-skinning agents, such as methyl ethyl ketoxime, and/or other suitable additives.

The invention also involves a method for tinting a paint by selecting a base paint from a set of base paints and subsequently mixing the base paint with one or more of the above-described pigment pastes. Although in theory it is possible to mix all colours using a single clear base paint, generally also white base paints are used in tinting systems to obtain colours with sufficient hiding power. Different grades of white pigmented base paints may be used, if so desired. Generally, also a limited number of pre-tinted base paints are used to enhance the scope of the miscible colours with sufficient hiding power. Separate base paints for high-gloss, or satin gloss paints may also be used, if so desired.

Pigment pastes according to the present invention are particularly useful for mixing with solvent borne base paints preferably based on an alkyd resin, either hyperbranched or not. The pigment pastes are also suitable for use with high solids base paints having a VOC below 300 g/l.

The invention is further described and illustrated by the following examples. In these examples the compositions listed below are available as indicated.

| | |
|---|---|
| Borchigen ® ND | wetting agent, available from Borchers, Germany; |
| Duploxid ® Red214 M | red pigment based on iron oxides, available from Rockwood Italia, Turin, Italy; |
| Flammruss ® 101 | carbon black, available from Degussa AG, Frankfurt, Germany; |
| Hostaperm ® Violet RL NF | violet pigment, available from Clariant, Frankfurt, Germany; |
| Kronos ® 2310 | white pigment, titanium dioxide, available from Kronos International Inc, Leverkusen, Germany; |
| Rhodoline ® DF 311 M | foam control agent, available from Rhône-Poulenc, Courbevoie, France; |
| Setal ® 1961 WS 60 | alkyd available from Akzo Nobel Resins, Bergen op Zoom, Netherlands; |
| Setal ® 216 WX 65 | alkyd available from Akzo Nobel Resins, Bergen op Zoom, Netherlands; |
| Shellsol ® D60 | aromate-free solvent, available from Shell, Netherlands; |
| Sicopal ® Yellow L1100 | yellow pigment, available from BASF, Ludwigshafen, Germany; |

In the examples, all amounts of contents are given in parts by weight unless indicated otherwise.

The viscosity was measured at 23° C. at a shear of 100 s$^{-1}$, in accordance with ISO 3219. The non-volatile content was calculated in accordance with ISO 3251. The acid number was measured in accordance with ISO 3682.

The drying time was measured by means of a BK Drying Recorder. To this end, the coating composition was applied on a glass plate with a draw bar. Curing took place at 10° C. and 80% relative humidity in a climatised room. The results are classified as follows:

Phase 1  the line traced by the pin closes up again ("open time").
Phase 2  the pin traces a scratchy line ("dust free").
Phase 3  the pin traces a straight line in the paint which does not close up again ("tack-free time").

EXAMPLE 1

An alkyd was prepared according to the process of U.S. Pat. No. 5,158,608 using a monomer selection which resulted in a calculated degree of branching of 0.39. The air-drying groups were formed by using tall oil fatty acid. No hypophosphorous acid was used. The acid value of the obtained alkyd was between 6 and 12, whereas the mean average molecular weight Mn was about 2,000 g/mole. The oil length was 79%. The measured viscosity was 2.0–3.2 Pa.s at 23° C. at a shear rate of 100 $s^{-1}$.

EXAMPLE 2

White Pigment Paste

A white pigment paste was made by mixing 25 parts by weight of the alkyd of Example 1 with 6.1 parts by weight of Shellsol® D60, 68 parts by weight of Kronos® 2310, 0.4 part by weight of methylethyl ketoxime, and 0.5 part by weight of Borchigen® ND. The mixture was milled to fineness.

The volatile organic content was calculated to be 130 g/l.

EXAMPLE 3

Black Pigment Paste

A black pigment paste was made by mixing 74.5 parts by weight of the alkyd of Example 1, 2.0 parts by weight of Shellsol® D60, 15 parts by weight of Flammruss® 101, 0.5 part by weight of methylethyl ketoxime, 0.3 part by weight of Rhodoline DF 311 M. After milling, another 7.7 parts by weight of Shellsol® D60 were added. The mixture was milled to fineness.

The volatile organic content was calculated to be 120 g/l.

EXAMPLE 4

Red Pigment Paste

In this example, a red pigment paste was made by mixing 31.3 parts by weight of the alkyd of Example 1, 7.3 parts by weight of Shellsol® D60, 60 parts by weight of Duploxid® Red 214 M, 0.7 part by weight of methylethyl ketoxime, and 0.7 part by weight of Borchigen® ND. The mixture was milled to fineness.

The volatile organic content was calculated to be 175 g/l.

EXAMPLE 5

Yellow Pigment Paste

A yellow pigment paste was made by mixing 23.6 parts by weight of the alkyd of Example 1, 8.05 parts by weight of Shellsol® D60, 66 parts by weight of Sicopal® Yellow L1100, 0.8 part by weight of methylethyl ketoxime, 0.3 part by weight of Rhodoline® DF 311 M, and 1.25 parts by weight of Borchigen® ND. The mixture was milled to fineness.

The volatile organic content was calculated to be 230 g/l.

EXAMPLE 6

Violet Pigment Paste 64 parts by weight of the alkyd of Example 1 were mixed with 20 parts by weight of Shellsol® D60, 15 parts by weight of Hostaperm® Violet RL NF, 0.7 part by weight of methylethyl ketoxime, and 0.3 part by weight of Rhodoline® DF 311 M. The mixture was milled to fineness.

The volatile organic content was calculated to be 219 g/l.

EXAMPLE 7

A colourless base paint based on two non-hyperbranched alkyds (Setal® 1961 WS 60 and Setal® 216 WX 65) was tinted with the pigment paste of Example 6. Before tinting, the viscosity of the base paint was 0.70 Pa.s. The solids content of the base paint was about 61% by weight. After being tinted with the pigment paste in a mixing ratio of 12 to 100, the mixture had a viscosity of 0.71 Pa.s, whereas the volatile organic content was approximately 375 g/l.

The resulting violet paint was shown to be stable for at least three months. Drying times typically were in the range of 2 hours (open time), 7.5 hours (dust free) and 12 hours (tack free). The colour acceptance and the gloss were very good.

EXAMPLE 8

A white base paint based on a soya alkyd, Setal® 270 WS 70, was tinted with the pigment paste of Example 6. Before tinting, the viscosity of the paint was 0.55 Pa.s. The solids content of the base paint was 70% by weight. After being tinted with the pigment paste in a ratio of 3 to 100, the mixture had a viscosity of 0.57 Pa.s, whereas the volatile organic content was 380 g/l. The resulting violet paint was shown to be stable for at least three months. Drying times were in the range of 2.5 hours (open time), 5 hours (dust free), and 8 hours (tack free). The colour acceptance and the gloss were very good.

What is claimed is:

1. A pigment paste for tinting a coating composition, the pigment paste comprising at least one branched alkyd having a viscosity below 5 Pa.s at 23° C. and at a shear rate of 100 $s^{-1}$, and one or more pigments.

2. The pigment paste according to claim 1, wherein the at least one branched alkyd has a viscosity below 3.5 Pa.s at 23° C. and at a shear rate of 100 $s^{-1}$.

3. The pigment paste according to claim 1, wherein the number average molecular weight Mn of the alkyd is more than 1,500 g/mole.

4. The pigment paste according to claim 1, wherein the number average molecular weight Mn of the alkyd is between 2,000 and 2,400 g/mole.

5. The pigment paste according to claim 1, wherein the degree of branching of the alkyd is at least 0.35.

6. The pigment paste according to claim 1, wherein the degree of branching of the alkyd is at least 0.35 and below 0.42.

7. The pigment paste according to claim 1, wherein the oil length is at least 76.

8. The pigment paste according to claim 1, wherein the oil length is at least 76 and below 84.

9. The pigment paste according to claim 1, wherein the acid value is between 6 and 9 mg KOH/g.

10. The pigment paste according to claim 1, wherein the pigment paste further comprises one or more aromate-free solvents.

11. The pigment paste according to claim 10, wherein the one or more aromate-free solvents is an aliphatic hydrocarbonic solvent, ketone and/or ester having a molecular weight Mn below 1,500.

12. The pigment paste according to claim 10, wherein the solvent content is below 28% by weight.

13. The pigment paste according to claim 10, wherein the solvent content is from 2–25% by weight.

14. The pigment paste according to claim 1, wherein the volatile organic content VOC is below 300 g/l.

15. The pigment paste according to claim 1, wherein the volatile organic content VOC is below 250 g/l.

16. A method for tinting a paint, comprising selecting a base paint from a set of base paints and subsequently mixing it with one or more pigment pastes according to claim 1.

17. The method according to claim 16, wherein the base paint is a solvent borne composition comprising an alkyd.

18. A pigment paste for tinting a coating composition, the pigment paste being made by mixing at least one branched alkyd having a viscosity below 5 Pa.s at 23° C. and at a shear rate of 100 s$^{-1}$, and one or more pigments.

* * * * *